United States Patent
Bahai et al.

(10) Patent No.: US 6,275,525 B1
(45) Date of Patent: Aug. 14, 2001

(54) ENHANCED METHOD FOR ADAPTIVE EQUALIZATION TECHNIQUE IN MOBILE WIRELESS SYSTEMS

(75) Inventors: Ahmad Reza Bahai, Lafayette, CA (US); Kumud Kumar Sanwal, Iselin, NJ (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 09/471,683

(22) Filed: Dec. 23, 1999

Related U.S. Application Data

(60) Provisional application No. 60/113,704, filed on Dec. 24, 1998.

(51) Int. Cl.[7] .............................. H03H 7/30; H03H 7/40; H03K 5/159
(52) U.S. Cl. ........................ 375/232; 375/341; 714/795
(58) Field of Search ................................. 375/265, 341, 375/262; 714/792, 794, 795

(56) References Cited

U.S. PATENT DOCUMENTS

| | | |
|---|---|---|
| 4,847,871 | 7/1989 | Matsushita et al. . |
| 4,862,483 | 8/1989 | Clark . |
| 5,263,033 * | 11/1993 | Seshadri ............................. 714/792 |
| 5,263,053 * | 11/1993 | Wan et al. ........................... 375/285 |
| 5,311,523 | 5/1994 | Serizawa et al. . |
| 5,862,156 | 1/1999 | Huszar et al. . |
| 5,862,192 | 1/1999 | Huszar et al. . |
| 5,933,457 | 8/1999 | Hottinen . |

OTHER PUBLICATIONS

Yow–Jong Liu, "Performance of Adaptive Equalization and Self–Decision Decoding Techniques over TDMA Digital Radio Channels" IEE, 1992.*

* cited by examiner

*Primary Examiner*—Chi Pham
*Assistant Examiner*—Phuong Phu
(74) *Attorney, Agent, or Firm*—Armstrong Teasdale LLP

(57) ABSTRACT

A method for adaptively equalizing an output of a digital communication channel, including steps of: generating an initial channel estimation; determining an initial set of metric states of a trellis, based on known symbols of a received input signal comprising a sequence of symbols; updating the set of metric states according to the initial channel estimation and the received signal; updating a set of paths for the metric states using a delayed tentative decision of a symbol of the received signal, to determine a set of survivor paths; and updating the channel estimation, based on the updated metrics, delayed tentative decision, and the received signal.

26 Claims, 3 Drawing Sheets

ENHANCED METHOD FOR ADAPTIVE EQUALIZATION TECHNIQUE IN MOBILE WIRELESS SYSTEMS

CROSS REFERENCE TO RELATED APPLICATIONS

This application claims the benefit of Provisional Application Ser. No. 60/113,704, filed Dec. 24, 1998, which is hereby incorporated by reference in its entirety.

BACKGROUND OF THE INVENTION

The present invention relates to any digital wireless mobile system which employs a training sequence. More specifically, the present invention relates to a demodulation technique for decoding a received signal under channel impairment conditions.

In digital wireless mobile system technology demodulating a received signal under channel impairment conditions may require the use of specialized digital signal processing techniques. Demodulation in this case refers to the extraction of a message signal from a modulated carrier after it has propagated through a transmission (radio) channel.

In wireless systems, the radio channel may impose severe signal impairments. For example, the mobility of a wireless unit causes channel variations known as Doppler effect. Moreover, the reception of a signal via multiple propagation paths also results in delay spread, which introduces intersymbol interference within the received signal and may add destructively.

In addition, due to the movement of the mobile unit, the characteristics of the delay spread and its resultant intersymbol interference can change rapidly with time. Therefore, to optimize reception, propagation signal impairments must be eliminated, or else utilized in ways which can improve the demodulation of the signal data.

To demodulate an impaired signal in wireless technology, the receiver must first estimate the channel via a training sequence, which is a sequence of symbols either prefixed, postfixed, or positioned in the middle of the frame to a transmitted sequence of symbols, and is known by the receiver. Assuming that the model for the impairments, in the form of multi-tap channel coefficients, is known by the receiver, and that the input-output characteristics of the channel may be regarded as constant during at least one symbol interval, the MLSE (Maximum likelihood Sequence Estimation) equalizer process can be used to demodulate the received signal. This detection technique uses an estimated model for the channel characteristics to update the branch metrics used in a Viterbi decoding process. Since the channel characteristics are a function of the movement of the mobile station, the channel may vary every signaling interval. Therefore, for reliable demodulation performance under severe channel impairment conditions, frequent updates of the channel model are required.

In prior art approaches to the demodulation of a signal with a delay spread impairment, a decision feedback equalizer is often used. Also, the General MLSE approach and adaptive MLSE approaches are used as well. However, most commonly used prior art channel estimation techniques may not provide sufficient accuracy, or they may suffer from excessive lag, due to inherent decision delays. As such, overall receiver performance can be significantly degraded.

Accordingly, it is an object of the present invention to overcome the disadvantages of the prior art by providing an adaptive-predictive estimation scheme which provides a reliable demodulation process for a received signal with severe channel impairments.

BRIEF SUMMARY OF THE INVENTION

The present invention is, in one embodiment, a method for adaptively equalizing an output of a digital communication channel, including steps of: generating an initial channel estimation, determining an initial set of metric states of a trellis, based on known symbols of a received input signal comprising a sequence of symbols; updating the set of metric states according to the initial channel estimation and the received signals updating a set of paths for the metric states using a delayed tentative decision of a symbol of the received signal, to determine a set of survivor paths; and updating the channel estimation, based on the updated metrics, delayed tentative decision, and the received signal.

This process enables reliable demodulation performance under conditions of severe channel impairments.

Illustrative embodiments of the present invention are more fully described below in conjunction with the following drawings.

DETAILED DESCRIPTION OF THE INVENTION

Figure 1:
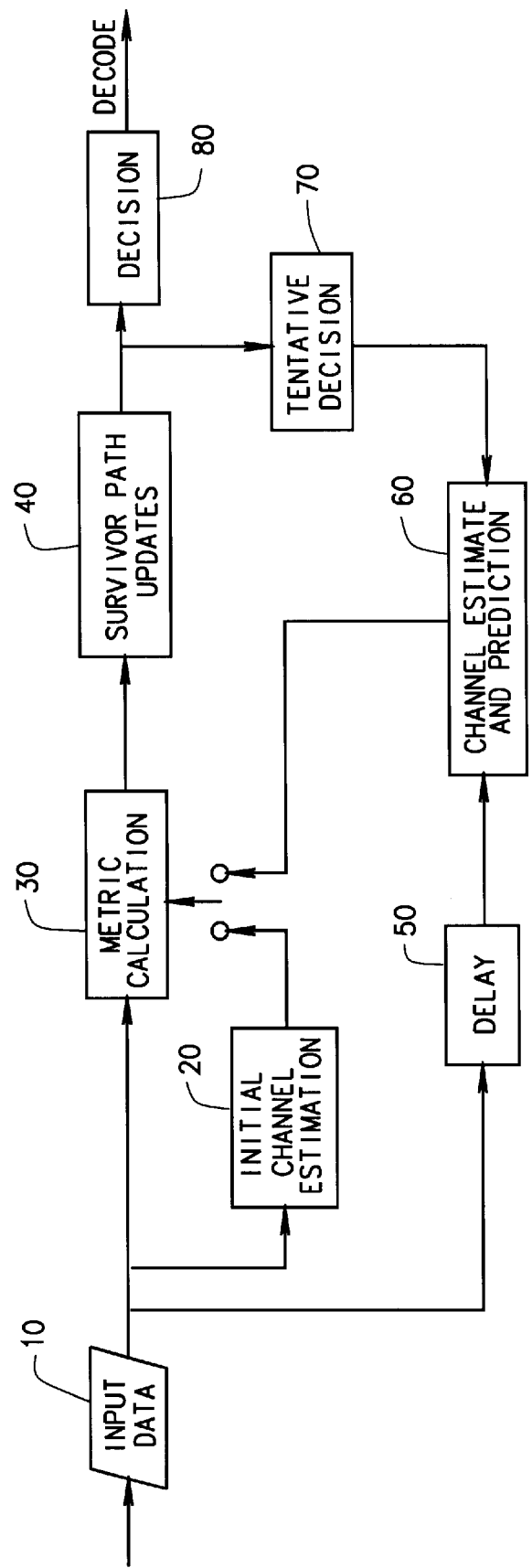
FIG. 1 is a block diagram illustrating the steps of one embodiment of the inventive method.

Processing operations in one embodiment of an MLSE equalizer are described below. For purposes of the following description, the signal to be detected is taken to be a transmitted sequence of symbols, either prefixed or postfixed or in the middle of the frame with a known sequence of symbols (the training pattern). The MLSE equalizer uses the Viterbi process or algorithm, which involves the computation of a metric that relates to the transmitted sequence likelihood. The metric used is the square of the difference between a prediction and the received sample data known as Euclidean metric. The resultant value is used in the expression for likelihood ratio. Operations included in one embodiment of the inventive process are shown in block diagram form in FIG. 1, and are described below:

1) Initial Channel Estimation/Training (10, 20):

Since the channel is modeled as a multi-tap channel, the coefficients of the channel are estimated, in one embodiment, by correlating the training sequence with the received data, and adaptively refining the model coefficients. This correlation is implemented when the signal segment to be demodulated includes a training sequence with pseudo-random properties in terms of its auto-correlation. Otherwise, the starting values are set to zero. In one embodiment, an initial channel estimation is a blind estimation.

The coefficient adaptations are based on a least mean square (LMS) algorithm or process, and the channel estimates are refined by correcting the prediction error in each received data sample using the current channel estimates. This adaptation is performed repeatedly on the same data to obtain a finer convergence of channel estimates. In each iteration the training sequence is reversed to accommodate the channel variation.

2) Initial Metric Assignment (30):

Since the transmitted sequence starts with a known sequence of symbols, the initial state of the Viterbi process is deterministic. The trellis starts from known training sequence and ends in the known pre/post amble symbols. The metric value for this state is set to 0, whereas the metrics for all other states are set to large positive values, to ensure that the known initial state is the sole survivor in further metric updates.

3) Metrics/Paths Updates (10, 30, 40, 50, 60):

For each symbol to be decoded in the Viterbi process, the most likely states of the symbol stage are determined. In general, the metrics computed for all states at the previous stage are available, so the metrics for all allowed transitions to the symbol stage are computed. This computation uses the channel estimates and the received signal data, by obtaining the corresponding symbols from the state transition being considered.

Figure 2:
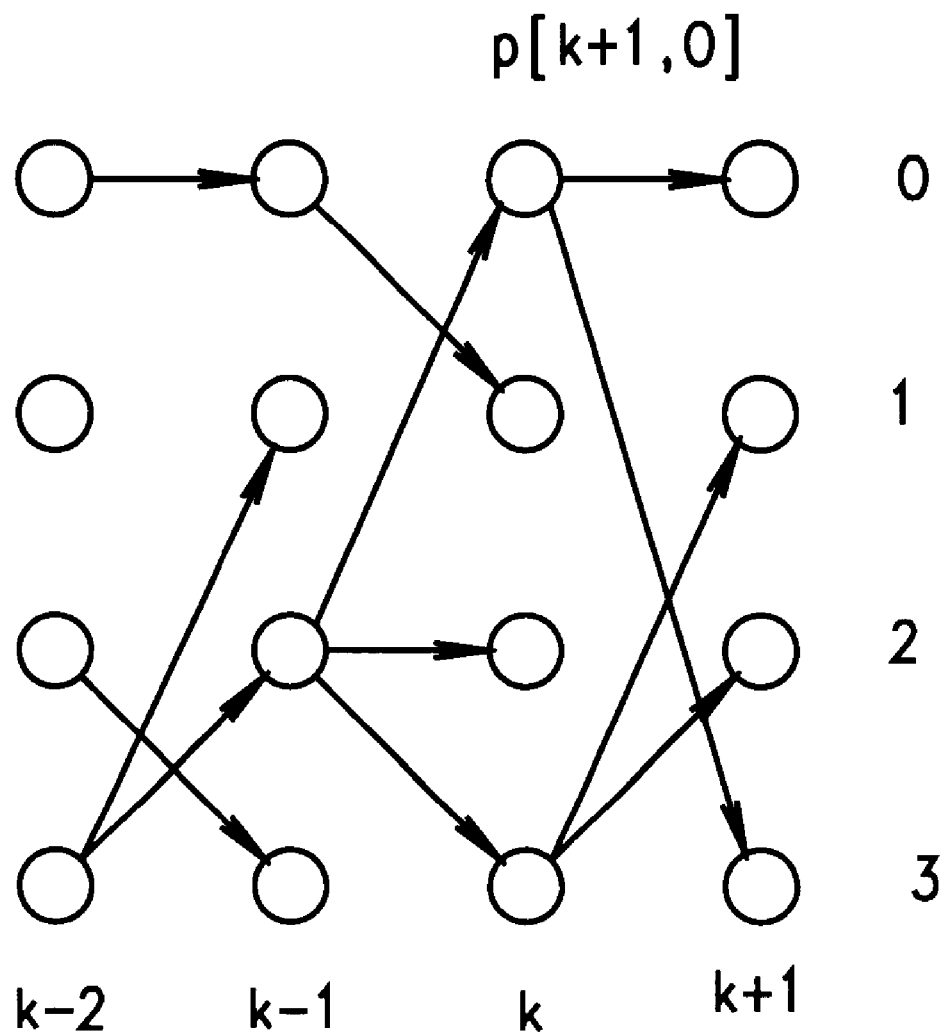
FIG. 2 is a diagram depicting state paths in a Viterbi Trellis.

Referring to a Viterbi Trellis, as depicted in FIG. 2 an update ot the metric at a symbol k is based on metrics available at a symbol k−1. Assuming that states at k−1 are indexed by m, and that states at k are indexed by n, an accumulated metric for state m at symbol k−1 is denoted by $$d[k-1,m].$$

A metric for a transition from state m at k−1 to state n at k is denoted by $$w[k,m \rightarrow n].$$

This metric is computed as the squared difference between samples received at k and those predicted, based on channel estimates and states k−1 and k. Thus, a metric at symbol k is updated for each n as follows:

$$d[k, n] = \min_{m}\{d[k - 1, m] + 2[k, m \rightarrow n]\}, \quad \text{(Equation 1)}$$

and a path update is performed by selecting an m that minimizes this metric, as follows:

$$p[k, n] = \arg\left(\min_{m}\{d[k - 1, m] + w[k, m \rightarrow n]\}\right) \quad \text{(Equation 2)}$$

In this manner, a set of survivor paths for each stage is obtained and stored.

4) Channel Updates (30, 40, 50 60, 70, 80):

In addition to building up state paths and updating metrics, channel estimates are also updated. In one embodiment, the channel estimate is updated after each set of metric updates, because the channel may change quite rapidly, e.g., due to fading.

Metrics are updated at symbol k, and are sorted to obtain a tentative decision $T_k$, as follows:

$$T_k = \arg\left(\min_{n}\{d[k, n]\}\right) \quad \text{(Equation 3)}$$

With this tentative decision, the preceding states are determined from state paths to be used in channel updates, as follows:

$$T_{k-1} = p[k, T_k], T_{k-2} = p[k-1, T_{k-1}] \quad \text{(Equation 4)}$$

Thus, on the basis of the tentative decisions and the past received sample data, the channel update is implemented using an LMS adaptation. The LMS adaptation result is then filtered to take into account the channel memory.

In one embodiment, the characteristics of a fading channel are utilized to improve channel prediction. A fading channel has a spectrum that is normally related to the maximum Doppler frequency in the system. In a multi-path environment, different paths have the same spectrum, because fading impairment is due to movement of the mobile unit. As such, the fading channel coefficients have a unique autocorrelation. A prediction filter using this unique autocorrelation is used, in one embodiment, to predict the channel coefficients a few symbols ahead, based on delayed tentative decisions.

In one embodiment, the prediction filter is configured as a suitable order ARMA (auto regressive moving average) model of reasonable complexity, and optimized for the most critical performance requirement; i.e., highest Doppler frequency.

5) Bit Decoding:

When metrics have been updated for an entire data sequence to be demodulated, the final metrics are sorted to determine a best final state. State paths are then traced back to determine a best (Maximum Likelihood) sequence of symbols. The bits used for encoding the transmitted sequence can then be extracted (decoded) from the sequence thus obtained.

In one embodiment of the present invention, MLSE is used to provide optimum performance with respect to minimizing sequence error probability. The use of initial channel estimation provides the information needed to perform the MLSE. The use of a tentative adaptive decision gives the receiver the capability to better follow channel variations. Furthermore, path metrics, which are computed to judge the relative likelihood of different sequences, are updated with improved (updated) channel estimates.

It will be seen that the embodiments of the present invention described above provide channel estimation which is robust and current for the branch metrics being updated by use of channel prediction. As a result, receiver performance is improved.

The above described channel adaptation and prediction process involves a single tentative decision. This decision is used to update the channel estimate, and to perform channel prediction using a prediction filter. The derivation of the prediction filter is based on the spectrum of a fading channel. However, this tentative decision may be in error, and could affect the reliability of the channel estimate.

Therefore, in another embodiment of the present invention, instead of making a single tentative decision, the channel estimate is updated for each final state at each stage. Thus, during the metric update, the channel estimate corresponds to each origination state. This origination state is then used for computing the transition metric, for the transition from this state to the destination states. After the metric updates and the selection of the survivor paths, a channel estimate can be made for each survivor path. Thus, at the next stage, a channel estimate is available for each origination state. Thus, a gain in performance is provided in exchange for some processing power.

In yet another embodiment, the channel prediction is dynamically optimized by estimating an amount of fading, thereby estimating the maximum Doppler frequency in the fading signal, which is related to the speed of the mobile unit. This embodiment provides fine-tuning, of channel prediction, which is thus optimized for the current speed of the mobile unit.

In yet another embodiment, the timing for the sample data is optimized for the channel model being used in the MLSE.

That is, the optimal sampling time is one in which the total energy in the delay-spread signal is maximized at the locations corresponding to the channel coefficients used for the MLSE. This is accomplished in a digitally sampled signal by re-sampling the data using a low-pass re-sampling filter. with timing derived from the training pattern.

Figure 3:
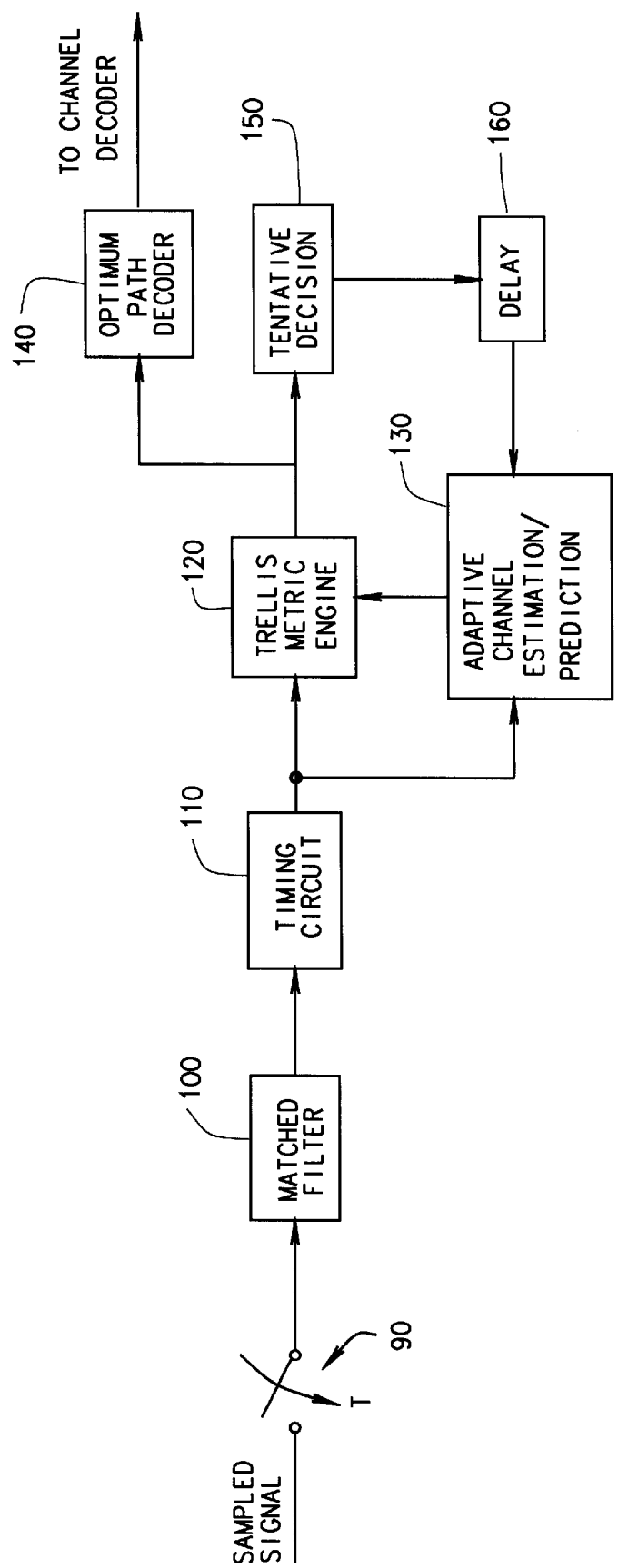
FIG. 3 is a block diagram of an embodiment of a processor of the present invention.

In one embodiment, and referring to the block diagram of FIG. 3, a processor receives a sampled signal from a channel through a sampler 90. The processor includes a matched filter 100 and a timing circuit 110. Output from timing, circuit 110 is fed to both a trellis metric engine 120 and an adaptive channel estimator/predictor 130. Adaptive channel estimator/predictor 130 provides information to improve performance of trellis metric engine 120. The output of trellis metric engine 120 is provided to an optimum path decoder 140, which provides an output to a channel decoder so that the received message is decoded. The output of trellis metric engine 120 is also provided to tentative decision block 150, which is delayed 160, and used to refine the adaptive channel estimation/prediction 130.

The present invention is applicable to other forms of receiver implementation, due to its adaptive nature. Moreover, the present invention has application beyond mobile radio terminals, such as in other products that utilize parameter estimation and tracking, where a means exists for testing the viability of the results.

In short, various embodiments of an adaptive-predictive scheme for updating channel estimates in a wireless mobile receiver are disclosed, each providing improved estimation of a transmitted symbol sequence and derivation of the modulated bit data therefrom, even in the presence of severe channel impairments and low signal-to-noise ratio. Moreover, embodiments of the disclosed method can be used in other devices that perform parameter estimation and tracking.

The above described embodiments of the invention are intended to be illustrative only. Numerous modifications and alterations may be devised by those skilled in the art without departing from the spirit and scope of the following claims.

What is claimed is:

1. A method for adaptively equalizing an output of a digital communication channel, comprising:
   generating an initial channel estimation;
   determining an initial set of metric states of a trellis, based on a training sequence of known symbols of a received input signal comprising a sequence of symbols;
   updating the set of metric states according to the initial channel estimation and the received signal;
   updating a set of paths for the metric states using a delayed tentative decision of a symbol of the received signal, to determine a set of survivor paths; and
   updating the channel estimation, based on the updated metrics, delayed tentative decision, and the received signal;
   and further comprising iterated training to determine the meteric states of the trellis, wherein in each iteration, the training sequence is reversed.

2. A method in accordance with claim 1 wherein generating an initial channel estimation comprises generating a blind estimate.

3. A method in accordance with claim 1 wherein the channel estimation is updated after each update of the set of metrics.

4. A method in accordance with claim 1, wherein:
   generating an initial channel estimation comprises starting a maximum likelihood sequence estimation (MLSE) process;
   determining an initial set of metric states comprises starting a Viterbi algorithm;
   the set of metric states is updated based upon the initial channel estimation, the received signal, and the delayed tentative decisions;
   updating the channel estimation includes using a bidirectional least square adaptation to update the channel estimation;
   and further comprising:
   updating the metric sets and the set of paths for each recieved message symbol, using the update channel estimates;
   sorting the updated metric states to determine a best final state;
   tracking back the paths to determine a maximum likelihood sequence of transmitted message symbols and replacing the tentative decisions; and
   recovering the transmitted message from the maximum likelihood sequence.

5. A method in accordance with claim 4 further comprising updating the channel estimations for each of a set of surviving paths of the set of paths.

6. A method in accordance with claim 4 wherein the initial channel estimation is based on estimating channel coefficients by correlating a known training sequence prefixed or postfixed to the received signal before it is transmitted; and adaptively refining the estimated channel coefficients using the LMS adaptation algorithm.

7. A method in accordance with claim 4 wherein updating of the set of metric states comprises updating accumulated metrics utilizing a relationship written as:

$$d[k, n] = \min_m \{d[k-1, m] + w[k, m \to n]\}$$

where k and k−1 are symbol states,
n and m are indexes for symbol states k and k−1, respectively,
d[k−1, m]=accumulated metric for state m at symbol k−1, and
w[k,m→m]=metric for the transition from state m at k−1 to state n and k.

8. A method in accordance with claim 4 wherein updating of the set of paths comprises updating paths utilizing a relationship written as:

$$p[k, n] = \arg\left(\min_m \{d[k-1, m] + w[k, m \to n]\}\right)$$

where p[k,n]=updated path for symbol k−1 to symbol k.

9. A method in accordance with claim 4 wherein updating of the channel estimation comprises determining a tentative decision $T_k$ at symbol k, and tentative decisions $T_{k-1}$, $T_{k-2}$, ..., at preceding states k−1, k−2, ..., where $$T_k = \arg\left(\min_n \{d[k, n]\}\right)$$

and $$T_{k-1} = p[k, T_k], T_{k-2} = p[k-1, T_{k-2}],.$$

10. A method in accordance with claim 9 wherein the channel estimation is implemented by an LMS adaptation.

11. A method in accordance with claim 10 wherein a prediction filter is used to predict channel coefficients a number of symbols ahead of the tentative decisions.

12. A method in accordance with claim 11 wherein the prediction filter is optimized by estimating a maximum Doppler frequency in the received signal.

13. A method in accordance with claim 4 wherein the received signal has a delay spread, and the received signal is sampled at an optimal rate, based on maximizing total energy in the delay spread of said received signal.

14. An adaptive equalizer device for an output of a digital communication channel, said device configured to:
generate an initial channel estimation;
determine an initial set of metric said of a trellis, based on a training sequence of known symbols of a received input signal comprising a sequence of symbols;
update the set of metric states according to the initial channel estimation and the received signal;
update a set of paths for the metric states using a delayed tentative decision of a symbol of the received signal, to determine a set of survivor paths; and
update the channel estimation, based on the updated metrics, delayed tentative decision, and the received signal;
and further configured to train iteratively to determine the metric states of the trellis, wherein in each iteration, the training sequence is reversed;
determine an initial set of metric states of a trellis, based on a training sequence of known symbols of a received input signal comprising a sequence of symbols;
update the set of metric states according to the initial channel estimation and the received signal;
update a set of paths for the meteric states using a delay tentative decision of a symbol of the received signal, to determine a set of survivor paths;
update the channel estimation, based on the updated metrics, delayed tentative decision, and the received signal; and
to update said channel estimations for each of a set of surviving paths of the set of paths.

15. A device in accordance with claim 14 wherein said device being configured to generate an initial channel estimation comprises said device being configured to generate a blind estimate.

16. A device in accordance with claim 14 configured to update the channel estimation after each update of the set of metrics.

17. A device in accordance with claim 14,
wherein:
said device being configured to generate an initial channel estimation comprises said device being configured to start a maximum likelihood sequence estimation (MLSE) process;
said device being configured to determine an initial set of metric states comprises said device being configured to start a Viterbi algorithm;
said device is configured to update the set of metric states based upon the initial channel estimation the received signal, and the delayed tentative decisions;
said device is configured to update the channel estimation using a bidirectional least square adaptation;
and said device is further configured to:
update the metric states and the set of paths for each received message symbol, using the updated channel estimates;
sort the updated metric states to determine a best final state;
track back the paths to determine a maximum likelihood sequence of transmitted message symbols and replace the tentative decisions; and
recover the transmitted message from the maximum likelihood sequence.

18. A device in accordance with claim 17 further configured to update the channel estimations for each of a set of surviving paths of the set of paths.

19. A device in accordance with claim 17 configured to base the initial channel estimation on an estimate of channel coefficients by correlating a known training sequence prefixed or postfixed to the received signal before it is transmitted; and to adaptively refine the estimated channel coefficients using the LMS adaptation algorithm.

20. A device in accordance with claim 17 wherein said device being configured to update the set of metric states comprises said device being configured to update accumulated metrics utilizing a relationship written as:

$$d[k, n] = \min_{m}\{d[k-1, m] + w[k, m \to n]\}$$

where k and k−1 are symbol states,
n and m are indexes for symbol states k and k−1, respectively,
d[k−1m]=accumulated metric for state m at symbol k−1, and
w[k,m→n ]=metric or the transition from state m at k−1 to state n at k.

21. A device in accordance with claim 17 wherein said device being configured to update the set of paths comprises said device being configured to update paths utilizing a relationship written as:

$$p[k, n] = \arg\left(\min_{m}\{d[k-1, m] + w[k, m \to n]\}\right)$$

where p[k,n]=updated path for symbol k−1 to symbol k.

22. A device in accordance with claim 17 wherein said device being configured to update the channel estimation comprises said device being configured to determine a tentative decision $T_k$ at symbol k, and tentative decisions $T_{k-1}, T_{k-2}, \ldots$, at preceding states k−1, k−2, ..., where $$T_k = \arg\left(\min_{n}\{d[k, n]\}\right)$$

and $$T_{k-1} = p[k, T_k], T_{k-2} = p[k-1, T_{k-2}].$$

23. A device in accordance with claim 22 wherein said device is configured to implement the channel estimation using an LMS adaptation.

24. A device in accordance with claim 23 further configured to use a prediction filter to predict channel coefficients a number of symbols ahead of the tentative decisions.

25. A device in accordance with claim 24 wherein said device is configured to optimize the prediction filter by estimating a maximum Doppler frequency in the received signal.

26. A device in accordance with claim 17 wherein the received signal has a delay spread, and said device is configured to sample the received signal at an optimal rate, based on maximizing total energy in the delay spread of said received signal.

* * * * *